United States Patent
Aslandere

(10) Patent No.: US 11,436,772 B2
(45) Date of Patent: Sep. 6, 2022

(54) METHOD FOR GENERATING AN IMAGE DATA SET FOR REPRODUCTION BY MEANS OF AN INFOTAINMENT SYSTEM OF A MOTOR VEHICLE

(71) Applicant: Ford Global Technologies, LLC, Dearborn, MI (US)

(72) Inventor: Turgay Isik Aslandere, Aachen/NRW (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/480,589

(22) Filed: Sep. 21, 2021

(65) Prior Publication Data
US 2022/0108502 A1    Apr. 7, 2022

(30) Foreign Application Priority Data

Oct. 6, 2020 (DE) .......................... 102020212580.5

(51) Int. Cl.
| | |
|---|---|
| *G06F 3/048* | (2013.01) |
| *G06T 11/20* | (2006.01) |
| *G06F 3/0482* | (2013.01) |
| *B60K 35/00* | (2006.01) |
| *G06F 3/04886* | (2022.01) |

(52) U.S. Cl.
CPC ............ *G06T 11/206* (2013.01); *B60K 35/00* (2013.01); *G06F 3/0482* (2013.01); *B60K 2370/1438* (2019.05); *B60K 2370/1529* (2019.05); *B60K 2370/164* (2019.05); *G06F 3/04886* (2013.01); *G06T 2200/24* (2013.01)

(58) Field of Classification Search
CPC ... G06T 11/206; G06T 2200/24; B60K 35/00; B60K 2370/1529; B60K 2370/164; B60K 2370/1438; G06F 3/0482; G06F 3/04886
See application file for complete search history.

(56) References Cited

U.S. PATENT DOCUMENTS

| | | | |
|---|---|---|---|
| 10,223,134 B1* | 3/2019 | Penilla | G06F 3/04845 |
| 10,275,959 B2* | 4/2019 | Ricci | G06F 16/183 |
| 2008/0211652 A1* | 9/2008 | Cope | B60K 35/00 |
| | | | 340/461 |

(Continued)

FOREIGN PATENT DOCUMENTS

| | | |
|---|---|---|
| DE | 102005004202 A1 | 8/2006 |
| DE | 102010054217 A1 | 6/2012 |

(Continued)

OTHER PUBLICATIONS

DE Search Report dated Jun. 28, 2021 (Non-English).

(Continued)

*Primary Examiner* — David Phantana-angkool
(74) *Attorney, Agent, or Firm* — Brandon Hicks; Bejin Bieneman PLC

(57) ABSTRACT

An image data set is generated for output by an infotainment system of a motor vehicle. Input data sets associated with respective functions of the infotainment system are clustered according to at least one predetermined criterion. The clustered input data sets are evaluated to determine at least one parameter of a circular representation for the image data set, which is generated using the at least one determined parameter.

16 Claims, 4 Drawing Sheets

(56) References Cited

U.S. PATENT DOCUMENTS

| | | | | |
|---|---|---|---|---|
| 2010/0268426 A1* | 10/2010 | Pathak | ................ | G06F 3/04886 345/173 |
| 2011/0107265 A1* | 5/2011 | Buchanan | .............. | G06Q 30/02 715/835 |
| 2012/0079427 A1* | 3/2012 | Carmichael | ............. | G06F 16/44 715/825 |
| 2014/0106726 A1* | 4/2014 | Crosbie | ................ | B60W 50/14 455/418 |
| 2021/0165552 A1* | 6/2021 | Revelsby | ............ | G06F 3/04842 |
| 2021/0200393 A1* | 7/2021 | Wohlstadter | ........ | G06F 3/04883 |
| 2021/0234849 A1* | 7/2021 | Lamb | ................... | H04W 12/06 |

FOREIGN PATENT DOCUMENTS

| | | |
|---|---|---|
| DE | 102016221466 A1 | 5/2018 |
| EP | 2439701 A1 | 4/2012 |
| EP | 3040830 A1 | 7/2016 |

OTHER PUBLICATIONS

Bowman et al., "3D User Interfaces: Theory and Practice", (Addison-Wesley, 2005, Computers—478 pages); Google Books.

Gebhardt et al., "Extended Pie Menus for Immersive Virtual Environments", Journals & Magazines, IEEE Transactions on Visualization and Computer Graphics (vol. 19, Issue 4, Apr. 2013)—Abstract only.

HUD—Continental Magazine, "Seeing Things Like You've Never Seen Them Before".

\* cited by examiner

METHOD FOR GENERATING AN IMAGE DATA SET FOR REPRODUCTION BY MEANS OF AN INFOTAINMENT SYSTEM OF A MOTOR VEHICLE

CROSS-REFERENCE TO RELATED APPLICATION

This patent application claims priority to German Application No. DE 102020212580.5 filed Oct. 6, 2020, which is hereby incorporated by reference in its entirety.

BACKGROUND

In motor vehicles, particularly passenger vehicles, an infotainment system is understood to be the combination of car radio, navigation system, hands-free device, driver assistance systems, and other functions, in a central operating unit.

SUMMARY

The present disclosure relates to generating an image data set for reproduction by an infotainment system of a motor vehicle.

A method for generating an image data set for reproduction by means of an infotainment system of a motor vehicle comprises:

reading in input data sets which are associated with respective functions of the infotainment system, clustering the input data sets according to at least one predetermined criterion, evaluating the clustered input data sets in order to determine at least one parameter which is indicative of a pie chart representation for the image data set, and generating the image data set using the at least one determined parameter.

The image data set may be configured for visualization by means of a display such as a touchscreen, on a head-up display, for providing a virtual and/or enhanced reality. The input data sets are associated with respective functions of the infotainment system, for example, commands for controlling a navigation system, for example, starting the navigation system, entering a destination, starting the navigation, etc.

By means of clustering, groups of input data sets are formed, the associated functions of which are depicted in a pie chart, for example, by icons. Cluster analyses (also known as agglomeration analysis) are understood to be methods for discovering similarity structures in (usually relatively large) databases. The groups of "similar" objects found in this way are also referred to as clusters, and the group association is referred to as clustering. The similarity groups found may be graph-theoretical, hierarchical, partitioning, or optimizing. The goal of cluster analysis is to identify new groups in the data.

By evaluating the clustered input data sets, at least one parameter is determined which is at least indicative of a dimension and/or another factor of the pie chart representation. In other words, a design of the pie chart representation determined or adjusted as a function of the clustered input data sets.

By means of such a pie chart representation, it is thus possible to achieve a structured arrangement, for example, of icons representing functions, which significantly simplify operation, since particularly relevant icons are particularly highlighted.

According to one embodiment, the at least one parameter is indicative of an area division of the pie chart representation. In this way, for example, it is possible to assign a particularly large fraction of the area of the pie chart to particularly frequently activated functions. Thus, such frequently activated functions are particularly easy to find and also to operate if they are visualized, for example, on a touchscreen.

According to a further embodiment, the at least one parameter is indicative of a number of subcharts of the pie chart representations. In other words, a first group of icons which are associated with a first group of input data sets is depicted by a first subchart, and a second group of icons which are associated with a second group of input data sets is depicted by a second subchart. Thus, for example, it is possible to depict particularly important functions by their icons in a first subchart, while less important functions are depicted by their icons in a second subchart.

According to a further embodiment, the at least one criterion is indicative of a user frequency. In other words, the functions are clustered according to the frequency with which they are activated by a driver within a predetermined time interval. Thus, functions which are particularly frequently activated by a driver are depicted by their icons in a particularly highlighted manner. This also allows a driver-specific customization of the pie chart representation, which, in addition, is able to adjust to changing user behavior by the driver.

According to a further embodiment, the at least one criterion is indicative of an importance. Thus, icons to which particularly basic functions are associated may be displayed in a particularly highlighted manner, even if they are relatively rarely activated by a driver. Thus, customization of the pie chart representation can be limited, and it can also be ensured that safety-related functions, for example, an emergency call function, can always be activated quickly and without problems, regardless of the frequency of their activation.

According to a further embodiment, the at least one criterion is indicative of a class. The association with a class determines whether, for example, the respective function is a function of a main menu or a function of a submenu. A menu is understood to be a control element and a form of interactive user guidance in a computer program, having a graphical user interface in the present case. A function may be selected via such a main menu. On the other hand, a submenu is understood to be a menu which is included in another menu. Thus, logically meaningful menu trees may be formed by means of a pie chart representation having a subchart, for a main menu having a plurality of subcharts for different submenus.

The present disclosure further includes a computer program product configured for carrying out such a method, an infotainment system for generating an image data set, and a motor vehicle comprising such an infotainment system.

BRIEF SUMMARY OF THE DRAWINGS

The drawings referenced in the below description are summarized as follows.

DESCRIPTION

Figure 1:
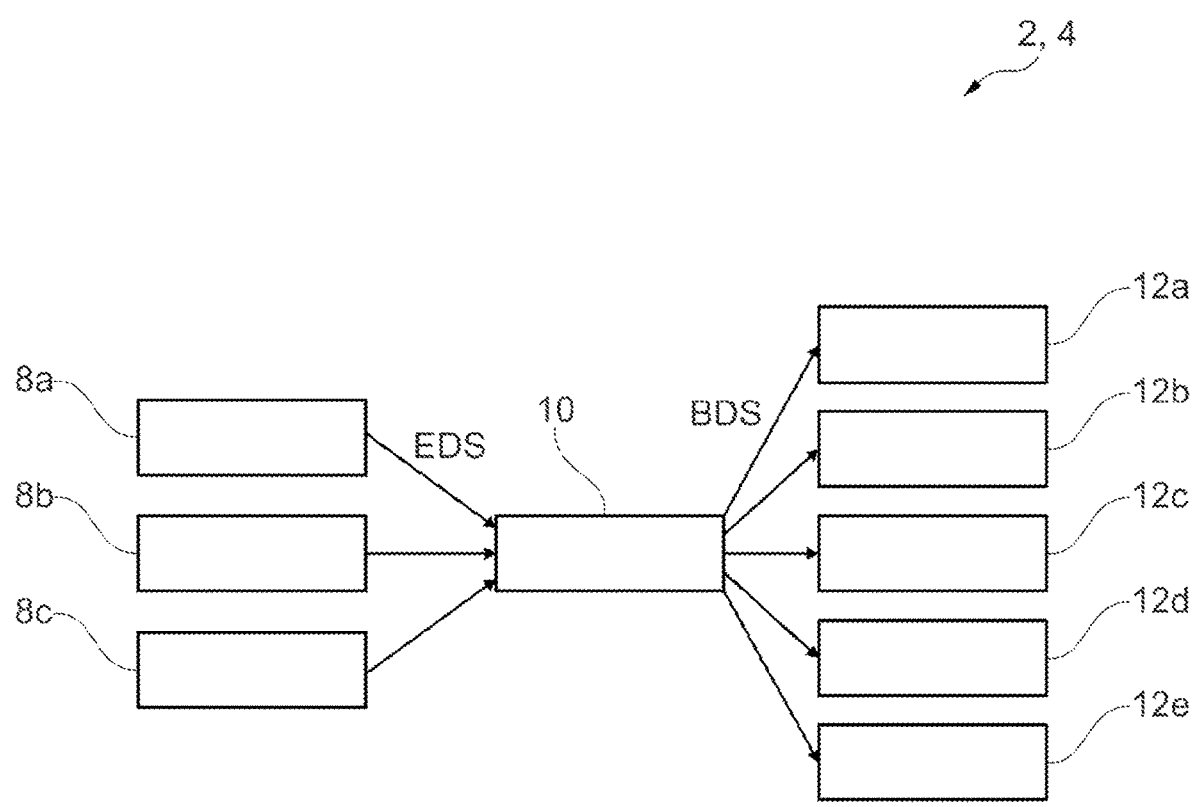
FIG. 1 is a schematic representation of components of an infotainment system of a motor vehicle.

Reference will first be made to FIG. 1.

Depicted are components of an infotainment system 4 of a motor vehicle 2, for example, of a passenger vehicle.

In the present exemplary embodiment, the infotainment system 4 provides functions of a car radio, a navigation system, a hands-free device, and driver assistance systems. In deviation from the present exemplary embodiment, the infotainment system 4 may also provide additional or other functions.

In the present exemplary embodiment, the infotainment system 4 comprises three input units 8a, 8b, 8c. The first input unit 8a comprises switches which are arranged on a steering wheel of the motor vehicle 2, the second input unit 8b is a display configured as a touchscreen, and the third input unit 8c is configured for gesture recognition and, for this purpose, comprises stereo and/or infrared camera systems as well as an evaluation unit for determining gestures made by the driver.

The three input units 8a, 8b, 8c respectively provide input data sets EDS which are indicative of interactions I performed by the driver (see figure). The three input units 8a, 8b, 8c may be considered to be input-side human-machine interfaces (HMIs).

The input data sets EDS are read in and evaluated by an electronic control unit (ECU) 10 in order to provide image data sets BDS, which are transmitted to output units 12a, 12b, 12c, 12d, 12e, in order to be visualized there to the driver.

In the present exemplary embodiment, the first output unit 12a is configured for providing an augmented reality. Augmented reality is understood to be a visual depiction of information, i.e., the supplementation of images or videos with computer-generated additional information or virtual objects by means of insertion and/or superposition.

In the present exemplary embodiment, the second output unit 12b is configured as a head-up display (HUD), in which the driver can maintain his/her head posture or viewing direction because information, i.e., the respective image data set BDS, is projected into said driver's field of view.

In the present exemplary embodiment, the third output unit 12c is configured as a display, for example, as a touchscreen.

In the present exemplary embodiment, the fourth output unit 12d is configured as a combination instrument, and is an instrument cluster which may comprise the combination of speedometer, odometer, tachometer, fuel gauge, coolant temperature gauge, and indicator lights, for example, for the direction indicator (turn signal).

In the present exemplary embodiment, the fifth output unit 12e is configured for providing a virtual reality. Virtual reality (VR) is understood to be the depiction and surroundings perception of reality and its physical properties in an interactive virtual environment which is computer-generated in real time.

The five output units 12a, 12b, 12c, 12d, 12e may be understood to be an output-side human-machine interface (HMI).

Figure 2:
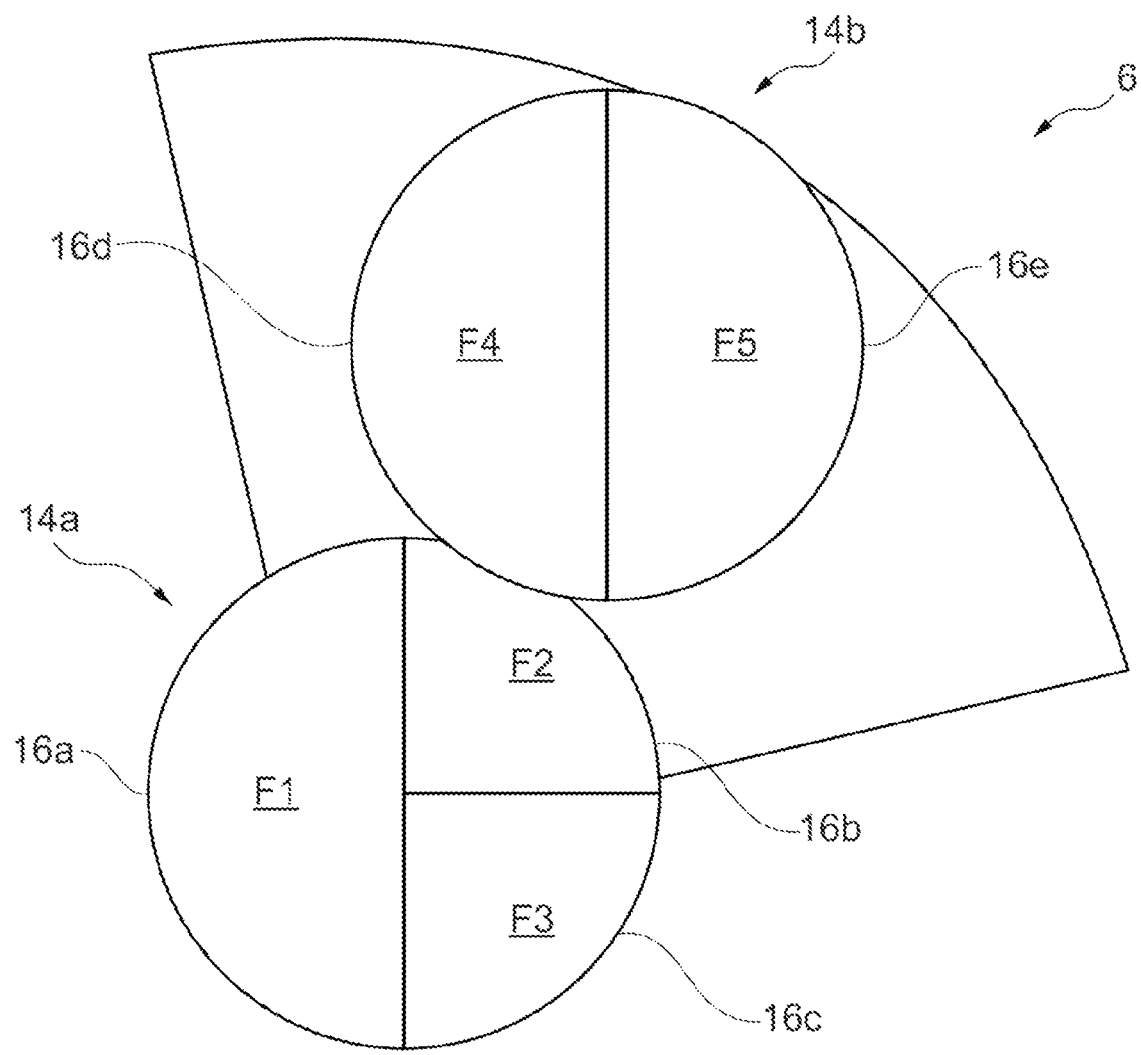
FIG. 2 is a schematic representation of a pie chart.

Making further reference to FIG. 2, a pie-chart representation 6 will now be explained which, in the present exemplary embodiment, is based one of the image data sets BDS which is transmitted to one of the output units 12a, 12b, 12c, 12d, 12e in order to be visualized there to the driver.

A pie-chart representation 6 is understood to be an essentially circular diagram which is divided into several circular sectors.

In the present exemplary embodiment, the pie-chart representation 6 comprises two subcharts 14a, 14b.

In the present exemplary embodiment, the first subchart 14a comprises three circular sectors 16a, 16b, 16c, while the second subchart 14b comprises two circular sectors 16d, 16e.

In deviation from the present exemplary embodiment, both the number of subcharts 14a, 14b and the number of circular sectors 16a, 16b, 16c, 16d, 16e may be different.

Each of the circular sectors 16a, 16b, 16c, 16d, 16e is associated with a function F1, F2, F3, F4, F5 of the infotainment system 4 which, for example, is visualized to the driver by a respective icon in the respective circular sector 16a, 16b, 16c, 16d, 16e. Thus, if the respective icons are visualized, for example, on the third output unit 12c configured as a touchscreen, the driver can activate the respective associated function F1, F2, F3, F4, F5 of the infotainment system 4 by touching them.

The circular sectors 16a, 16b, 16c, 16d, 16e have different fractions of the area of the respective subcharts 14a, 14b, i.e., they are formed having different sizes due to different angular ranges of the circular sectors 16a, 16b, 16c, 16d, 16e.

In the present exemplary embodiment, the first circular sector 16a comprises a 180° section, the second circular sector 18b comprises a 180° section, and the third circular sector 18c comprises a 180° section of the first subchart 14a, while the first circular sector 16d comprises a 180° section and the second circular sector 18e respectively comprises a 180° section.

For example, by touching the circular sectors 16a, 16b, 16c, the functions F1, F2, F3 can be activated, wherein, for example, touching the circular sector 16b activates the function F2, causing an activation of a submenu comprising the circular sectors 16d, 16e for the functions F4, F5. The submenus may, for example, be configured as drop-out or pop-up menus.

Figure 3:
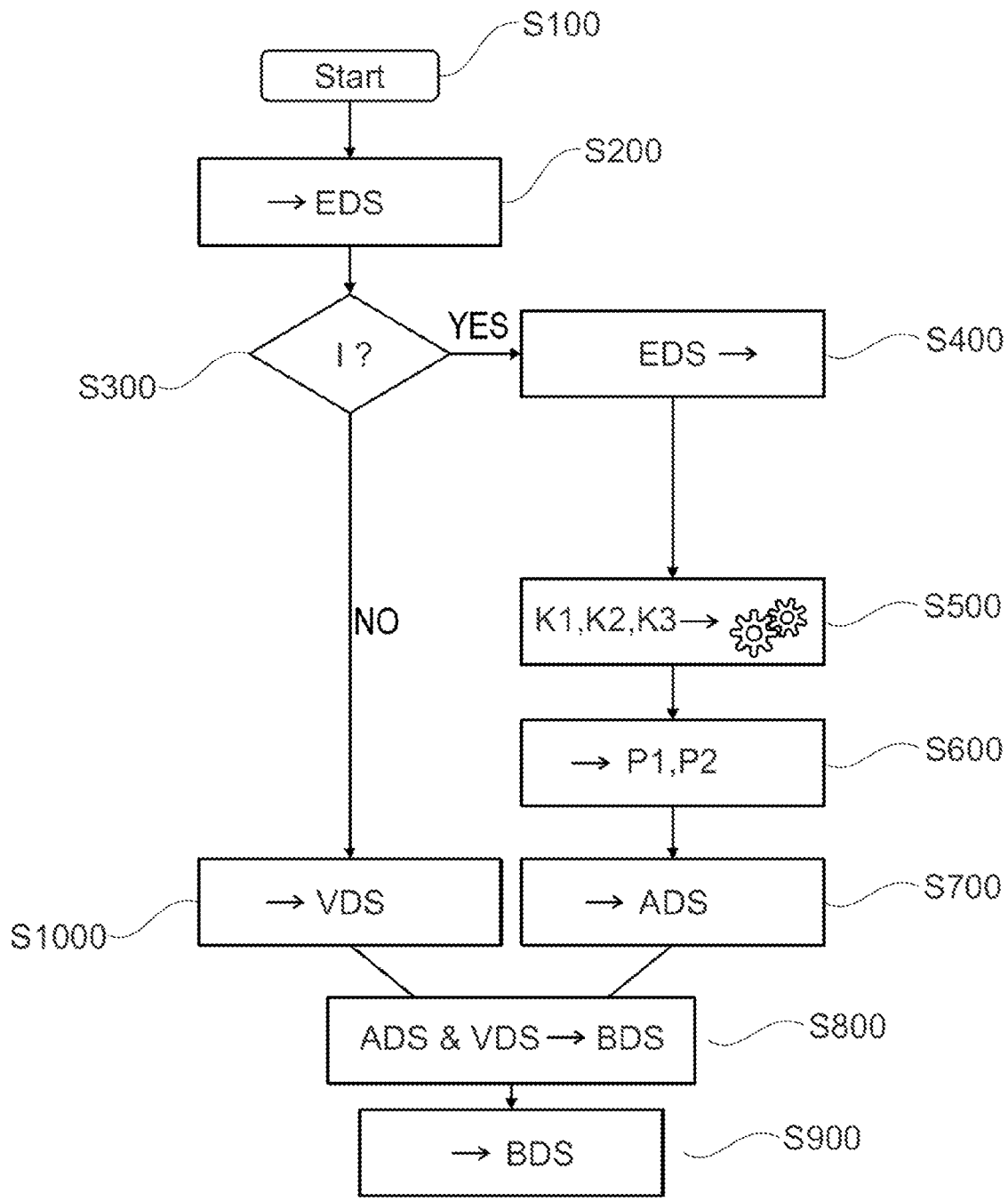
FIG. 3 is a schematic representation of a method sequence for operating the infotainment system depicted in FIG. 1.

Reference will now additionally be made to FIG. 3, in order to explain a method for generating the image data set BDS for reproduction by means of the infotainment system 4 of the motor vehicle 2, and in particular, for determining the number of subcharts 14a, 14b and the different fractions of the area of the circular sectors 16a, 16b, 16c, 16d, 16e.

The infotainment system 4, in particular the control unit 10 of the infotainment system 4, may comprise hardware and/or software components configured in particular for generating the image data set BDS, but also for performing other described tasks and functions.

The method begins with a step S100.

In a further step S200, the input data sets EDS are read in from the input units 8a, 8b, 8c.

In a further step S300, for example, the control unit 10 checks whether one of the read-in input data sets EDS is indicative of an interaction I of the driver with the infotainment system 4, i.e., whether the detected interaction I can be associated with one of the functions F1, F2, F3, F4, F5 of the infotainment system 4.

If one of the read-in input data sets EDS is indicative of an interaction I of the driver with the infotainment system 4, the method is continued with a further step S400.

In the further step S400, the input data sets EDS, which are indicative of an interaction I of the driver with the infotainment system 4, are temporarily stored in a memory.

In a further step S500, the temporarily stored input data sets EDS are clustered, for example, with the aid of the k-means algorithm or a centroid method.

A k-means algorithm is understood to be a method for vector quantization, said method also being used for cluster analysis. In this method, a previously known number of k groups is formed from a set of similar objects. The algorithm is one of the most frequently used techniques for grouping objects, as it quickly finds the centers of the clusters. The algorithm prefers groups having low variance and a similar size. The k-means algorithm is characterized by its simplicity.

The centroid method may be an agglomerative calculation. The agglomerative calculation of a hierarchical cluster analysis is the simplest and most flexible case. At the beginning, each object is initially considered to be a separate cluster. Then, in each step, the clusters which are respectively closest to one another are combined into one cluster. If a cluster is made up of several objects, it must then be specified how the distance between clusters is calculated. Here, the individual agglomerative methods differ. The method may be terminated if all clusters exceed/fall below a certain distance/similarity with respect to one other, or if a sufficiently small number of clusters has been determined. In the case of clusters having only one object, as they are specified at the beginning, this is trivial.

For carrying out an agglomerative cluster analysis, a distance or similarity measure may be selected for determining the distance between two objects, and a fusion algorithm may be selected for determining the distance between two clusters. The fusion algorithm may be based on a centroid method.

For example, DBScan or Mena Shift may be used as further methods for performing cluster analysis.

At least one predetermined criterion can be specified for clustering. In the present exemplary embodiment, a first criterion K1 is indicative of a user frequency, and a second criterion K2 is indicative of an importance, and a third criterion K3 is indicative of a class, of the functions F1, F2, F3, F4, F5.

In other words, groups are formed of which the group elements respectively have the same user frequency and/or the same importance. A set of groups may be formed for each criterion K1, K2, K3, or the two or more criteria K1, K2, K3 are combined, for example, by means of weighted or unweighted addition of the respective values for the criteria K1, K2, K3.

In a further step S600, the clustered input data sets EDS are evaluated in order to determine the at least one parameter P1, P2 which is indicative of the pie-chart representation 6.

In the present exemplary embodiment, a first parameter P1 is indicative of an area division of the pie-chart representation 6, and a second parameter P2 is indicative of a number of sub-charts 14a, 14b of the pie-chart representations 6. The size of the pie pieces i.e., for example, their angular dimension, may be varied for the area division of the pie-chart representation 6.

In a further step S700, a change data set ADS is generated using the at least one determined parameter P1, P2. In this way, the amount of data to be transmitted can be reduced.

In a further step S800, the change data set ADS is combined with a predetermined template data set VDS for a predetermined standard visualization of the functions F1, F2, F3, F4, F5, in order to generate the image data set BDS.

In the present exemplary embodiment, the predetermined template data set VDS may provide that the functions F1, F2, F3 are associated with a first class, and the functions F4, F5 are associated with a second class, wherein the functions F1, F2, F3 of the first class are associated with a main menu of the function F2, and the functions F4, F5 of the second class are associated with a submenu of the function F2.

According to the predetermined template data set VDS, identical areas are associated with the functions F1, F2, F3, i.e., thirds of circles are associated with said functions, while semicircles are associated with the functions F4, F5.

In other words, if sufficient data are present for a change data set ADS, the predetermined template data set VDS is correspondingly modified according to the change data set ADS.

In a further step S900, the image data set BDS is visualized to the driver, for example, using rendering techniques, for example, by means of rasterization, in order to convert a vector graphic into a raster graphic.

However, if none of the read-in input data sets EDS is indicative of an interaction I of the driver with the infotainment system 4, the method is continued with a further step S1000.

In the further step S1000, the predetermined template data set VDS is read out from a memory.

Then, in the further step S800, only the predetermined template data set VDS is used to generate the image data set BDS.

In the further step S900, the image data set BDS based only on the predetermined template data set VDS is then visualized to the driver.

Figure 4:
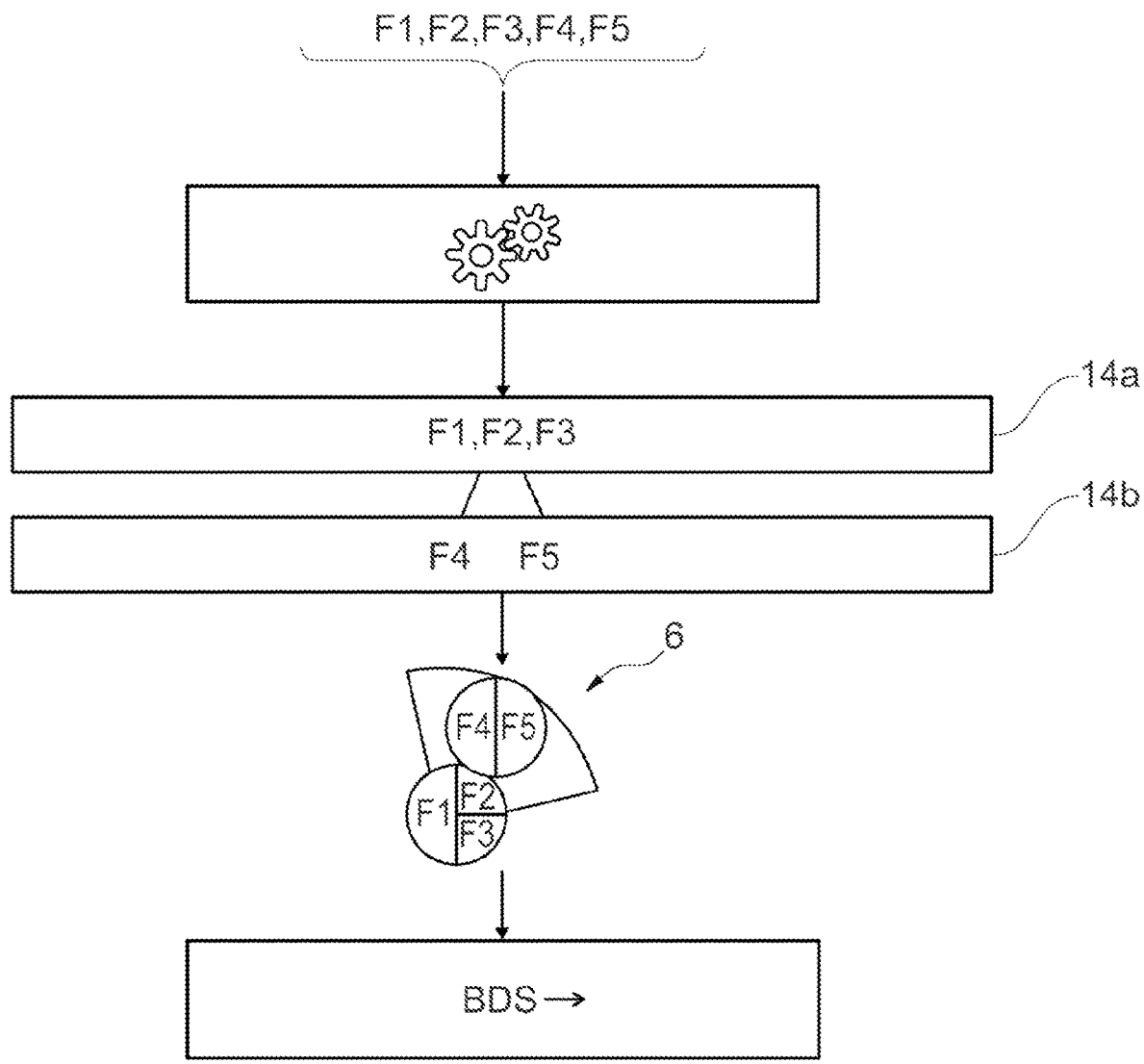
FIG. 4 is a schematic representation of further details of the method sequence shown in FIG. 3.

In particular, step S500 in FIG. 3 will now be explained in detail, making additional reference to FIG. 4.

In the present exemplary embodiment, the functions F1, F2, F3, F4, F5 of the infotainment system 4 may be associated with the interactions I.

For the function F1, a value of 50% was determined for a user frequency, and a value of 50% was also determined for the importance; for the function F2, a user frequency having a value of 25% was determined, and a value of 25% was also determined for the importance; for the function F3, a user frequency having a value of 25% was determined, and a value of 25% was also determined for the importance; for the function F4, a user frequency having a value of 50% was determined, and a value of 50% was also determined for the importance.

Furthermore, the functions F1, F2, F3 are associated with a first class, and the functions F4, F5 are associated with a second class. In the present exemplary embodiment, the functions F1, F2, F3 of the first class are functions of a main menu of the function F2, and the functions F4, F5 of the second class are functions of a submenu of the function F2.

As a result of the clustering, the functions F1, F2, F3 are associated with the first subchart, 14a, and the functions F4, F5 are associated with the second subchart 14b.

Corresponding areas are associated with the functions F1, F2, F3, corresponding to their user frequency; the same applies analogously to the functions F4, F5. In other words, F1, F4, and F5 are semicircles, and F2 and F3 are quarter circles.

Thus, for example, the functions F1, F2, F3 of the main menu can be activated by touching the circular sectors 16a, 16b, 16c, wherein, for example, touching the circular sector 16b activates the function F2, causing an activation of the submenu comprising the circular sectors 16d, 16e for the functions F4, F5.

In deviation from the present exemplary embodiment, the sequence of the steps may also be different. Furthermore, several steps may also be carried out at the same time or simultaneously. Furthermore, also in deviation from the present exemplary embodiment, individual steps may be skipped or omitted.

Thus, by means of such a pie chart 6, it is possible to achieve a structured arrangement of the icons representing the functions F1, F2, F3, F4, F5, which significantly simplify operation.

LIST OF REFERENCE SIGNS

2 Motor vehicle
4 Infotainment system
6 Pie-chart representation
8a Input unit
8b Input unit
8c Input unit
10 Control unit
12a Output unit
12b Output unit
12c Output unit
12d Output unit
12e Output unit
14a Subchart
14b Subchart
16a Circular sector
16b Circular sector
16c Circular sector
16d Circular sector
16e Circular sector
ADS Change data set
BDS Image data set
EDS Input data set
F1 Function
F2 Function
F3 Function
F4 Function
F5 Function
I Interaction
K1 Criterion
K2 Criterion
K3 Criterion
P1 Parameter
P2 Parameter
VDS Template data set
S100 Step
S200 Step
S300 Step
S400 Step
S500 Step
S600 Step
S700 Step
S800 Step
S900 Step
S1000 Step

The invention claimed is:

1. A human-machine interface system for a motor vehicle, comprising a computer program product configured to:
   read in data sets that are respectively associated with functions of an infotainment system;
   cluster the input data sets according to at least one predetermined criterion to determine measures of similarity between the respective functions;
   evaluate the clustered input data sets to determine at least one parameter of a circular representation of the functions;
   generate an image data set including the circular representation that includes sectors determined using the at least one determined parameter; and
   output the image data set based on the circular representation via the HMI system.

2. A method for generating an image data set for reproduction by a human-machine interface (HMI) system of a motor vehicle, comprising:
   reading in data sets that are respectively associated with functions of an infotainment system;
   clustering the input data sets according to at least one predetermined criterion to determine measures of similarity between the respective functions;
   evaluating the clustered input data sets to determine at least one parameter of a circular representation of the functions;
   generating an image data set including the circular representation that includes sectors determined using the at least one determined parameter; and
   output the image data set based on the circular representation via the HMI system.

3. The system of claim 1, wherein the at least one parameter is indicative of a number of subcharts of the circular representation.

4. The system of claim 1, wherein the at least one criterion is indicative of a user frequency.

5. The system of claim 1, wherein the at least one criterion is indicative of an importance.

6. The system of claim 1, wherein the at least one criterion is indicative of a class.

7. The method of claim 2, wherein the at least one parameter is indicative of an area division of the circular representation.

8. The method of claim 2, wherein the at least one parameter is indicative of an area division of the circular representation.

9. The method of claim 2, wherein the at least one parameter is indicative of a number of subcharts of the circular representation.

10. The method of claim 2, wherein the at least one criterion is indicative of a user frequency.

11. The method of claim 2, wherein the at least one criterion is indicative of an importance.

12. The method of claim 2, wherein the at least one criterion is indicative of a class.

13. The system of claim 1, wherein the circular representation is one of a plurality of circular representations of the functions of the infotainment system being provided via the HMI.

14. The method of claim 2, wherein the circular representation is one of a plurality of circular representations of the functions of the infotainment system being provided via the HMI.

15. The system of claim 1, wherein selection of one of the sectors in the circular representation activates one of the functions.

16. The method of claim 2, wherein selection of one of the sectors in the circular representation activates one of the functions.

* * * * *